Figure 1:
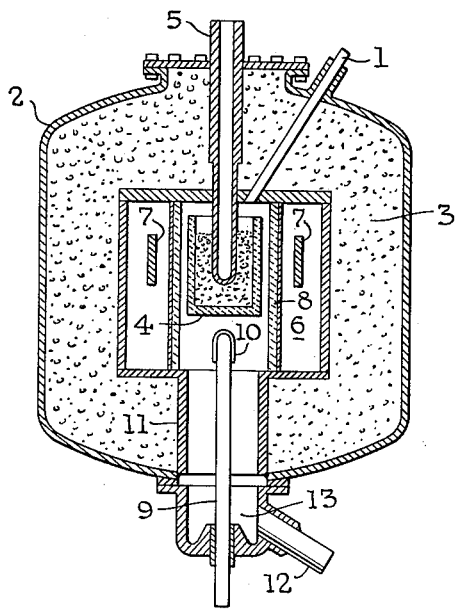

May 20, 1958

R. PERIERES ET AL 2,835,566

ALUMINUM MANUFACTURE

Filed Nov. 1, 1956

INVENTORS
René Perieres
and Louis Ruelle

BY Raphael Semsroved

ATTORNEY

2,835,566

ALUMINUM MANUFACTURE

René Perieres, La Tronche, and Louis Ruelle, Grenoble, France, assignors to Pechiney, Compagnie de Produits Chimiques et Electrometallurgiques, Paris, France, a corporation of France Application November 1, 1956, Serial No. 619,771

Claims priority, application France November 4, 1955

9 Claims. (Cl. 75—68)

It is known that aluminum nitride can be dissociated at high temperatures according to the following equation:

$$2AlN = 2Al + N_2$$
$$\text{Solid} \quad\quad \text{Gas}$$

It has already been proposed to manufacture aluminum by making use of the above reaction and condensing the resulting aluminum vapors; however, it has not been found possible in practice to develop this process commercially because there was obtained a very impure aluminum metal contaminated by aluminum nitride and carbide, as well as by aluminum oxide. Moreover, part of the metal was obtained in an extremely divided state and, for that reason, was difficult to recover. As a result, the yield in commercial grade aluminum was poor, and there was no industrial interest in the process.

The present invention, which is the result of applicants' researches, makes it possible to avoid these drawbacks.

The dissociation of aluminum nitride begins above 2200° C. at atmospheric pressure; accordingly, it is desirable to operate in a vacuum. As a result of their investigations, applicants have established an approximate formula relating the total dissociation pressure with the temperature, this formula being $$\log p = 10.258 - \frac{19{,}560}{T}$$

In this formula, $p$ represents the pressure in millimeters Hg, and $T$ the absolute temperature in degrees Kelvin. The base of the logarithm is 10.

In the process of the present invention, the working pressures are preferably lower than, or equal to, 40 millimeters Hg and the temperatures do not exceed 2000° C.

The present invention is based on the fact that, when operating under the above temperature and pressure conditions, there is formed a new compound namely, the monovalent aluminum cyanide having the formula:

$$AlCN$$

It has not been possible to isolate in the solid state this compound—which distils without melting at about 2200° C. at normal pressure—because, on cooling, it decomposes into carbon and aluminum nitride.

When aluminum nitride is decomposed in a vacuum, the aluminum cyanide AlCN is formed in the gaseous state by the mere contact of AlN with carbon at temperatures above 1500° C. In this connection, it should be pointed out that technical aluminum nitride, produced by the reaction of nitrogen with a mixture of aluminum oxide and carbon, always contains some carbon and aluminum oxide.

Therefore, one feature of the present invention consists in using, for the dissociation operation, an aluminum nitride containing as little carbon as possible, and in suppressing any contact between the carbon and the nitride to be dissociated in order to prevent the formation of AlCN because, in the course of the cooling operation, the monovalent aluminum cyanide would subsequently react with gaseous aluminum according to the equation $$3AlCN + 4Al = Al_4C_3 + 3AlN$$
$$\text{Gas} \quad\quad \text{Gas}$$

giving rise to the formation of carbonitrided deposits in the form of very hard, brown concretions (sinters) representing a weight loss of 5.25 units of aluminum per unit carbon. Therefore, it is not possible to obtain a satisfactory aluminum yield when the nitride to be dissociated contains an appreciable quantity of carbon.

Applicants' investigations have shown that there exists another cause for the formation of monovalent aluminum cyanide AlCN, i. e. by the reaction of aluminum suboxide $Al_2O$ in the vapor state with carbon in the presence of nitrogen, according to the following equation $$Al_2O + 3C + N_2 = 2AlCN + CO$$
$$\text{Gas} \quad\quad\quad \text{Gas}$$

As has been indicated above, technical nitride contains in addition to carbon, a little aluminum oxide which is converted into $Al_2O$ during the dissociation of the nitride at the expense of the liberated aluminum, according to the equation $$Al_2O_3 + 4Al = 3Al_2O$$
$$\quad\quad \text{Gas} \quad \text{Gas}$$

Accordingly, another feature of the present invention consists in using for the dissociation operation an aluminum nitride containing as little aluminum oxide as possible when high yields are desired.

It is also necessary to prevent $Al_2O$ vapor from coming into contact with the carbon; therefore, the latter material should be excluded from the furnace structure in those regions where the temperature exceeds 1500° C.

The suboxide $Al_2O$ decomposes on cooling, giving rise to very finely divided aluminum particles, solidified inside a solid lattice (network) of aluminum oxide. Therefore, even in the absence of any carbon wall or resistance, it is important to limit, as far as possible, the aluminum oxide content of the aluminum nitride.

Notwithstanding all the precautions that may be taken, technical nitride always contains a small quantity of carbon and aluminum oxide. Accordingly, when producing aluminum by the dissociation of aluminum nitride AlN in a vacuum at high temperature, there is always present a gaseous mixture of aluminum, aluminum cyanide AlCN and suboxide $Al_2O$.

It is preferably to obtain a condensate which can be removed in the liquid state in order to permit continuous operation.

The researches of the present applicants have shown that in order that the metal obtained be capable of flowing when all the vapors produced by the dissociation of the nitride are condensed together, the nitride should preferably contain less than 0.9% carbon in the absence of any aluminum oxide, and less than 6.8% aluminum oxide in the absence of carbon. When the nitride contains at the same time $a\%$ aluminum oxide and $c\%$ carbon, both quantities should preferably be related to each other, according to the equation $$a + 7.5c \leq 6.8 \quad\quad \text{(Equation A)}$$

This equation assumes that the aluminum oxide is wholly transferred to the condenser in the form of $Al_2O$, without meeting any carbon surface having a temperature higher than 1500° C.

It is easy to effect, thereafter, the separation of the metal from the carbide, nitride and aluminum oxide slags contained therein by known means.

However, it is possible to collect directly the pure commercial metal in the liquid state free of slags, and avoid the above-mentioned separation, both from a nitride with low carbon and aluminum oxide contents (for example, $Al_2O_3+C$ less than 0.5%), as well as from a nitride in which the aluminum oxide and carbon contents do not satisfy the above disclosed Equation A.

In fact, applicants' researches have shown that in a predetermined vacuum it was possible:

(1) to retain AlCN vapors at a temperature higher than the condensation point of the aluminum vapors, and (2) to condense aluminum at a temperature higher than the transformation point of $Al_2O$ vapors into $Al_2O_3+Al$.

Actually, it is difficult to obtain such a high degree of purity in a technical nitride and it may be preferable, for economic reasons, to operate on a product containing more carbon and aluminum oxide.

Therefore, one of the characteristics of the process of the present invention consists in placing in the path of the vapors, a surface the temperature of which is controlled in such a way as to retain the AlCN in the form of solid concretions (sinters) of AlN and $Al_4C_3$, while the aluminum vapors remain in the gaseous state.

For example, in a vacuum of 0.5 mm., the surface, which forms the trap for AlCN, will be maintained between 1400° and 1500° C., while the aluminum vapors will be condensed between 1200 and 1300° C.

$Al_2O$ vapors will only be converted to $Al_2O_3$ and Al at a substantially lower temperature, for example, at 1000°–1200° C. under a pressure of 0.5 mm.

The difference between the condensation temperature of the aluminum on the one hand, and the transformation temperatures of AlCN and $Al_2O$ on the other hand, remains substantially constant throughout the contemplated range of temperatures. In comparison to conditions at a pressure of 0.5 mm., there is simply a decrease of 100° of all the temperatures when the pressure is lowered to 0.1 mm., and an increase of 400° if the pressure rises to 40 mm.

These three regions of decreasing temperatures, which are required for the fractional condensation of AlCN, Al and $Al_2O$, may be disposed successively along the same duct in the direction of flow of the vapors. In that case, it is desirable to prevent the aluminum, which has condensed as a liquid on the duct walls, from coming into contact with the very finely divided mixture of $Al_2O_3$ and Al resulting from the condensation of $Al_2O$.

Therefore, there is introduced into the condensation zone of the aluminum vapors, a condenser of a known type, e. g. a liquid metal condenser (preferably a sheet or bath of aluminum) the surface temperature of which—controlled by known means, for instance, by circulation of water—lies between the condensation temperature of AlCN and that of $Al_2O$. Under these conditions, the aluminum alone will condense and will flow as a liquid without contacting the walls; when condensed in this manner in a compact or liquid state, it does not recombine with nitrogen.

The necessity of excluding the presence of carbon from all parts of the dissociation furnace where the temperature exceeds 1500° C. is extremely inconvenient, because graphite is an excellent and preferred refractory material having good thermal and electrical conductivity. The present invention also relates to a method for protecting graphite, which enables it to be used in the dissociation furnace without the risk of forming monovalent aluminum cyanide. Applicants have observed that high temperature carbide and nitride refractories and, particularly, those of tungsten, molybdenum, tantalum, titanium, zirconium, when used separately or mixed together, are not attacked by aluminum nitride at the dissociation temperature of the nitride and, further, that they are also inert towards the $Al_2O$-containing vapors which result from the dissociation. Therefore, such materials could be used in the construction of the furnace, but their weight and cost would be too high.

Therefore, the invention also relates to a process for protecting graphite by a thin layer of the materials mentioned above.

A "wash" or "slip" which can be applied by a brush is prepared by suspending a powdered refractory metal, carbide, or nitride (W, Mo, Ta, etc.) in an organic liquid which is susceptible of leaving, after drying followed by firing, a carbon skeleton (varnish or liquid adhesive, for example, an alcoholic solution of shellac, an aqueous solution of gum arabic, flour glues). By way of example, an excellent tungsten paint is obtained by diluting

|  | G. |
|---|---|
| Tungsten powder | 100 |
| In an alcoholic shellac solution | 50 |

Following drying at room temperature, firing in a vacuum at temperatures higher than 1000° C. and, preferably, between 1500° and 1800° C. assures, through carburization of the tungsten, a surface hardening of the graphite which exhibits comparatively good imperviousness and excellent resistance to mechanical abrasion and chemical corrosion by AlN or $Al_2O$.

The portion of the condenser on which aluminum condenses should not contaminate the liquid metal; agglomerated aluminum nitride is perfectly adapted for this purpose.

The surface which forms the trap for AlCN vapors may be made of uncoated graphite.

When $Al_4C_3$ and AlN concretions (sinters), resulting from the destruction of AlCN, accumulate on the trap to an extent which interferes with the operation of the apparatus, it is necessary to interrupt the operation in order to clean the trap-forming surface. This cleaning operation may be achieved by a mechanical tearing operation, but it has been observed that the condensation reaction of carbonitride sinters from AlCN and Al is a reversible reaction. At high temperature and in a high vacuum, the reaction is:

$$Al_4C_3 + 3AlN = 3AlCN + 4Al$$
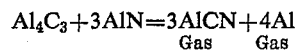

Therefore, a cleaning procedure—which is one of the objects of the invention—consists in raising the temperature of the trap surface to 1700° C., for example, at a pressure of 0.5 mm. Hg; the concretions (sinters) disappear and AlCN and Al can be removed and recovered without opening the apparatus, simply after a change of condenser.

Before effecting the above described cleaning operation, it is possible to recover the aluminum contained in the carbide $Al_4C_3$ by lowering the pressure to about 0.1 mm. Hg. The liberated aluminum is collected on the usual condenser and a mixture of AlN and carbon remains on the trap. The temperature is then raised to 1700° C. and the reformed AlCN is collected on a special condenser.

The mixture of aluminum oxide and aluminum obtained from the decomposition of $Al_2O$ may be collected on a removable jacket and then treated by known means.

The various concretions (sinters)—with or without extraction of the recoverable aluminum—can be returned to the nitriding furnace, after eventual addition of the proper quantity of carbon.

The process which is the object of the present invention lends itself to different modifications.

Aluminum nitride containing 0.9% carbon and more than 7% aluminum oxide can be dissociated without using the AlCN trap but by condensing $Al_2O$ separately. The aluminum, which then separates on the condenser, contains the concretions (sinters) resulting from AlCN, but flows in the liquid state.

The $Al_2O_3$ mixture obtained from the condensation of

Al₂O can subsequently be treated to recover the aluminum, and thereby improve the yield.

Aluminum nitride containing, for example, 2% carbon and 6.8% aluminum oxide, can also be dissociated by using the AlCN trap and simultaneously condensing Al₂O and Al on the condenser. This condensate flows in the liquid state. The major part of the metal combined with carbon in the carbonitride concretions (sinters) can be subsequently recovered by the means above indicated.

When all of the devices (arrangements) which form the object of this invention are used, it is possible to treat a nitride which is richer in aluminum oxide and carbon and still condense the aluminum in the liquid state; the yield is obviously the lower the higher the aluminum oxide and carbon content.

The economic conditions, that is the cost of the initial nitride and the cost of recovering aluminum contained in the sinters (concretions), or in the Al₂O+Al mixture resulting from the dissociation of Al₂O, etc., are the factors which, by themselves alone, can govern the selection of the most favorable working conditions.

Figure 2:
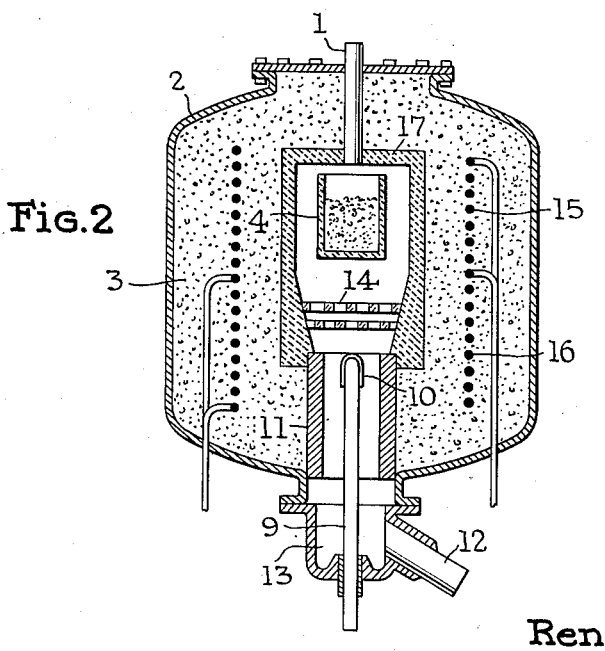

The accompanying Figures 1 and 2 illustrate diagrammatically in vertical cross-section two embodiments of furnaces which are adapted for the production of commercial aluminum by thermal dissociation of aluminum nitride in a vacuum. These figures are merely given here by way of example, and do not limit the invention. In these figures, the same reference numerals designate corresponding parts.

In Figure 1, reference numeral 1 designates the nitride supply tube; 2 is the vacuum-tight, steel casing; 3 is the heat insulating lining which may consist of granular petroleum coke; 4 is a graphite crucible coated inside and outside with molybdenum carbide by the process above described. This crucible contains the nitride charge to be dissociated which is heated to the selected temperature by means of an axial heating element 5 with penetrates into the interior of the nitride charge, such heating element being made of graphite completely coated with molybdenum carbide.

6 is a heating chamber containing resistances 7 which enable the surface 8 of the graphite sinters trap to be brought up to the selected temperature.

9 is the water-cooled condenser whose upper portion 10 is made of aluminum nitride. 11 is the vapor duct made of agglomerated aluminum nitride, upon which the Al₂O vapors are decomposed; 12 is the vacuum connection. Aluminum which condenses in the liquid state at 10 is collected in 13.

Figure 2 illustrates an apparatus having the same general arrangement as Figure 1; however, here the crucible 4 which contains the aluminum nitride to be dissociated, is heated by means of induction coils 15, the secondary being formed by the graphite cylinder 17, protected on its interior by a layer of molybdenum carbide. The double sinters trap 14 is formed of graphite plates having perforations to allow passage of the vapors. This trap also is heated by induction, by means of the coil 16.

*Example 1*

In the crucible 4 of Fig. 2, there are introduced through tube 1, 100 kgs. technical aluminum nitride containing 93.5% AlN, 6% Al₂O₃, and 0.5% carbon. The furnace is evacuated to about 0.5 mm. Hg and is then heated by means of coil 15 so as to raise the temperature of the nitride to be dissociated to about 1700° C. The double trap 14 is heated by means of coil 16 to a temperature within the range of 1400° to 1500° C., the upper portion of the condenser 10 being at 1200°–1300° C. and the wall 11 of the vapor duct at 1000°–1200° C.

The AlCN trap 14 retains about 3.7 kg. Al₄C₃+AlN sinters, the aluminum vapors condense in the liquid state at 10, and the metal falls down into 13 without contacting the walls 11 on which Al₂O has been decomposed, forming a solid deposit of aluminum oxide and very finely divided aluminum (about 13.1 kg.).

The metal thus collected (about 51.9 kg.) contains more than 99.7% aluminum, with the following impurities:

$$Fe=0.18\% \quad Si=0.04\%$$

It constitutes, therefore, an excellent commercial aluminum.

Efficiency:

$$\frac{\text{collected aluminum}}{\text{Al combined with N in the nitride}} \text{ attains } 84.3\%$$

It can attain 86.7% by further extracting the aluminum from the carbide contained in the carbonitrided sinters.

When a purer aluminum nitride is used initially, the sinters trap may be dispensed with, the free Al metal content being sufficient to enable the condensate to be removed in the liquid state.

*Example 2*

In a furnace of the form illustrated in Fig. 2, but with the trap 14 eliminated and the temperature in the condenser controlled to about 1000° C. in order that the aluminum vapors and the sinters condense there together, there are introduced into the crucible 4, 100 kg. of aluminum nitride containing 0.5% carbon and 2.5% aluminum oxide. A vacuum of 0.5 mm. Hg is established and the crucible 4 is heated to 1700° C. while the walls (suitably protected in this case) are heated above 1500° C. by means of coil 16.

There are obtained 67.8 kg. of a liquid condensate which flows into 13 and from which an be extracted, by remelting with a flux, 61.2 kg. of commercial aluminum.

The yield:

$$\frac{\text{collected aluminum}}{\text{Al combined with N in the nitride}}=95.8\%$$

We claim:

1. Process of producing aluminum by the dissociation of aluminum nitride in a vacuum at high temperatures into aluminum and nitrogen in the gaseous state, and whereby the aluminum is subsequently condensed in a condensation zone, and wherein the nitride is contaminated by carbon and aluminum oxide leading to the formation of detrimental carbonitride compounds by the reaction of the contaminants with the gaseous dissociation products, the improvement in said process which comprises the combination therewith the steps of: depositing the carbonitride compounds as sinters in a trap zone in advance of the aluminum condensation zone, and thereafter condensing the aluminum in the liquid state in the condensation zone, whereby the aluminum is recovered in a substantially pure condition.

2. Process according to claim 1, characterized in that it is carried out at a temperature not in excess of 2000° C. and at a pressure not in excess of 40 mm. Hg.

3. Process according to claim 1, wherein the nitride undergoing dissociation and the gases resulting from the dissociation are kept out of contact with carbon.

4. Process according to claim 1, characterized in that there is used a nitride containing "a" percent carbon and "c" percent aluminum oxide, whereby "a" and "c" are related by the equation $$a+7.5c\leqslant 6.8$$

5. Process according to claim 1, characterized in that the trap zone is disposed in the path of the dissociation gases to the condensation zone and further, that said trap zone is maintained at a temperature higher by about 100° C. degrees than the temperature of the condensation zone at the prevailing pressure.

6. Process according to claim 1, characterized in that the liquid aluminum obtained in the condensation zone is kept out of contact from any deposits separating out from the dissociation gases at a temperature lower than the temperature maintained in the aluminum condensation zone.

7. Process according to claim 1, characterized in that the dissociation gases comprise a mixture of AlCN, Al and $Al_2O$, and that these gases are progressively removed from the mixture in the order named at progressively decreasing temperatures at the prevailing pressure.

8. Process according to claim 1, characterized in that the temperature of the trap zone is periodically raised, whereby the sinters are dissociated into gaseous products and further, in that these products are recovered.

9. Process according to claim 1, characterized in that the pressure of the trap zone is periodically lowered, whereby the sinters are dissociated into gaseous products and further, in that the products are recovered.

References Cited in the file of this patent

UNITED STATES PATENTS

| 448,915 | Erlwein | Mar. 24, 1891 |
| 448,916 | Erlwein | Mar. 24, 1891 |
| 1,472,403 | Von Bichowsky | Oct. 30, 1923 |
| 1,506,269 | Von Bichowsky | Aug. 26, 1924 |
| 1,734,515 | Anderson | Jan. 14, 1930 |
| 2,444,422 | Bradford | July 6, 1948 |
| 2,625,472 | Scheuer | Jan. 13, 1953 |

FOREIGN PATENTS

| 10,741 | Great Britain | July 10, 1890 |
| 525,693 | Canada | May 29, 1956 |

OTHER REFERENCES

Mellor, vol. 8, Comprehensive Treatise on Inorganic and Theoretical Chemistry, pages 113–114, 1928.